Figure 1:
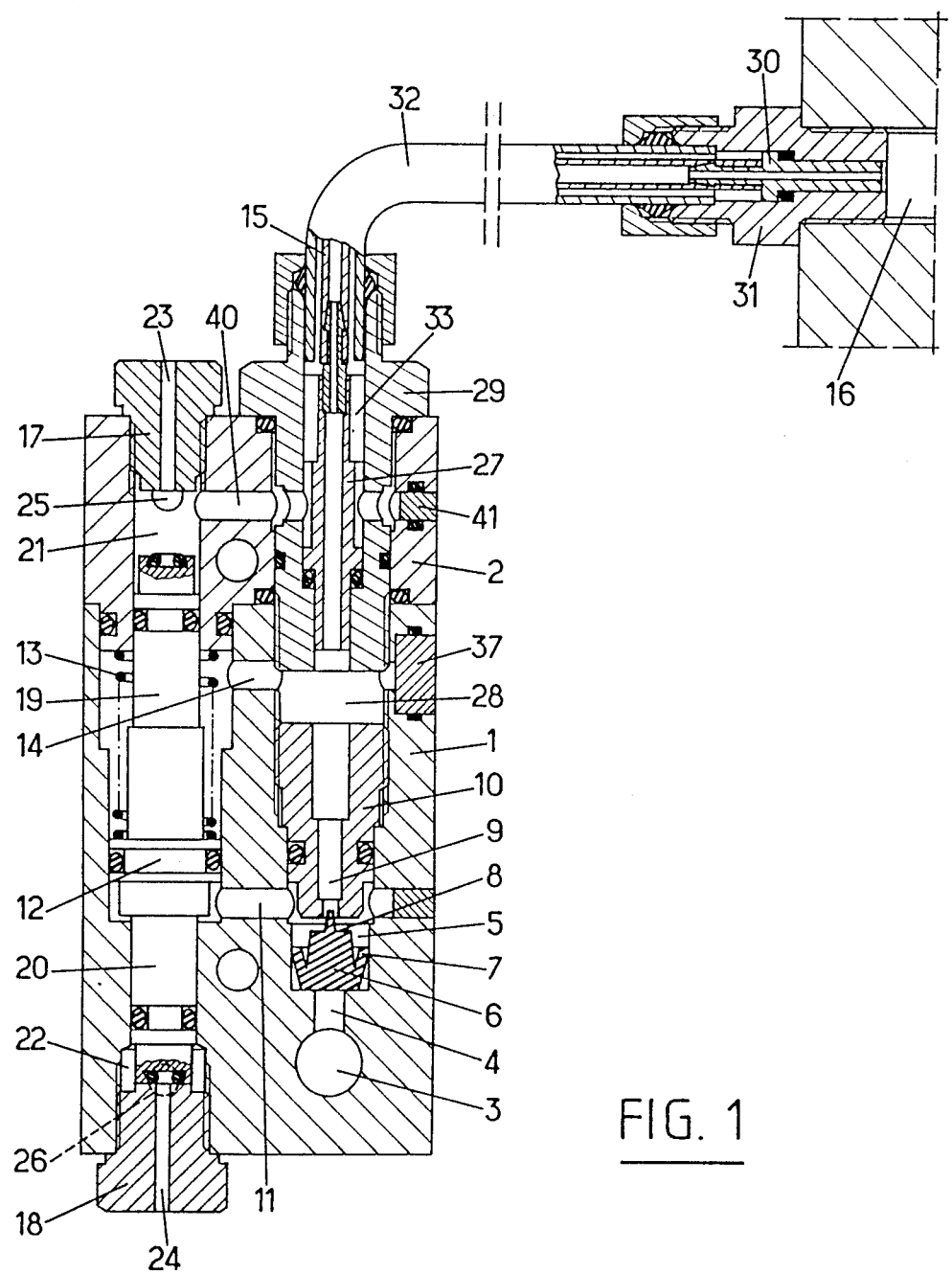

United States Patent [19]

Javelly et al.

[11] Patent Number: 4,951,785

[45] Date of Patent: Aug. 28, 1990

[54] CENTRALIZED GREASING DEVICE WITH MULTIPLE OPERATIONAL CHECKS

[75] Inventors: Christian Javelly, Allonnes; Rene Paris, St. Hillaire St. Florent, both of France

[73] Assignee: Consortium de Recherches Pour L'Application Des Fluides, Craf., Allonnes, France

[21] Appl. No.: 354,278

[22] Filed: May 19, 1989

[30] Foreign Application Priority Data

May 20, 1988 [FR] France ................ 88 06817

[51] Int. Cl.[5] .......................................... F16N 27/00
[52] U.S. Cl. .................................... 184/7.4; 184/6.4; 184/29; 184/39.1; 340/631
[58] Field of Search .................. 184/6.4, 7.4, 29, 39.1, 184/40, 108; 340/679, 631

[56] References Cited

U.S. PATENT DOCUMENTS

| | | | |
|---|---|---|---|
| 473,526 | 4/1888 | Miki et al. | 184/64 |
| 3,958,663 | 5/1976 | Moore | 184/6.4 |
| 3,995,717 | 12/1976 | Kroffke | 184/7.4 |
| 4,228,840 | 10/1980 | Wadkinson, Jr. | 165/11 R |

FOREIGN PATENT DOCUMENTS

| | | |
|---|---|---|
| 869332 | 11/1978 | Belgium . |
| 1675340 | 1/1971 | Fed. Rep. of Germany . |
| 2403512 | 4/1979 | France . |
| 83/02991 | 9/1983 | World Int. Prop. O. . |

Primary Examiner—Ira S. Lazarus
Assistant Examiner—Alan B. Cariaso
Attorney, Agent, or Firm—Beveridge, DeGrandi & Weilacher

[57] ABSTRACT

Centralized greasing installation, each stage of which comprises a metering piston (12) with two rods (19, 20), the ends of each of the two rods (19, 20) sliding respectively inside a lubrication chamber (21) and a resetting chamber (22), said chambers being supplied with air and connected to the atmosphere by a bore (23, 24) of an adjusting stopper (17, 18) which is closed by the end of the corresponding rod at the end of corresponding lubrication and resetting travel of the piston (12), with means for detecting the establishment of pressure, wherein the various lubrication air chambers (21) are connected together and to a common air source having a limited flow rate as well as to a common pressure switch, while the various resetting air chambers (22) are placed in communication with each other and with another compressed-air source having a limited flow rate and to another pressure control switch, in order to verify, with limited means, that between the resetting phase and the lubrication phase, all the metering pistons have in reality accomplished the entire designated travel.

4 Claims, 2 Drawing Sheets

CENTRALIZED GREASING DEVICE WITH MULTIPLE OPERATIONAL CHECKS

The invention relates to the centralized greasing devices of machines or vehicles of the type comprising a certain number of metering distributors supplied with lubricant by an intermittently pressurized primary duct, each of the metering distributors conveying a given and adjustable volume of lubricant towards one of the points to be greased by a separate secondary duct.

The main problem, with this kind of installation, is that it is necessary during each greasing cycle to verify that each of the metering pistons has in fact performed its set travel separately, which assumes both correct operation of the distributor and in particular the absence of blockage of the corresponding secondary duct.

In so-called cascade devices, the metering distributors are series-mounted, as it were, on the primary duct, in such a way that each metering piston only receives the fluid pressure if the preceding metering piston has performed its travel. In this way, it is sufficient to verify that the pressure is established at the end of the primary duct in order to verify simultaneously that none of the secondary ducts is obstructed.

The main drawback of this type of installation is that it generally uses cylindrical slide-valve pistons which are very precisely adjusted, and hence costly, and which nevertheless create large losses in head which accumulate from one end to the other of the primary duct, resulting in the need to use high supply pressures, while in actual fact the secondary ducts use only a low pressure.

Moreover, this type of installation requires fairly complex connections which makes it difficult, in particular to add additional distributors to an existing installation.

Centralized greasing installations are known, moreover, in which each distributor is mounted branched off from the primary duct, in order to avoid the need for high pressures and allow at the same time the use of seals so as to provide a more economical structure, and where the travel of each metering piston is checked by means of an auxiliary fluid, if necessary compressed air. For this purpose, each metering piston terminates in a rod at each end which at the end of a corresponding travel closes an orifice for connecting to the atmosphere a chamber supplied with air and actuating a pressure control switch.

However, this latter type of installation, exactly like the preceding one, although it manages to verify the real nature of the travel of the metering piston in both directions, and consequently the absence of blockage of the secondary duct, becomes ineffective in the event of a leak in one of the secondary ducts. In fact, in this case, the desired volume of lubricant is properly delivered by the corresponding distributor, but not received, or not entirely received, by the point to be greased.

The object of the present invention is to eliminate the above drawbacks, i.e. to provide a centralized greasing installation which requires only a moderate fluid pressure, which is economical, installation of which is easy to perform and modify, and which, finally, ensures both checking as to correct operation of each metering piston, the non-blockage of each secondary duct and the absence of leaks in each secondary duct.

For this purpose, the invention uses in a known manner metering pistons which, during a greasing phase of the greasing cycle, deliver the volume of lubricant towards the point to be greased and during a second phase of resetting of the greasing cycle, suck in the lubricant again by means of transferal from the other face of the piston.

In a known manner, also, each greasing piston is of the type with two rods each being displaced inside an air chamber with an end closed by a travel adjustment stopper, itself pierced by an axial orifice for connection to the atmosphere, one of the air chambers, or lubrication chambers, having its outlet to the atmosphere which is closed by the corresponding rod at the end of lubricating travel, while the other air chamber, or resetting chamber, has its outlet to the atmosphere which is closed by the corresponding rod at the end of resetting travel.

A first feature of the invention is that all the lubrication air chambers are placed in communication with each other, the assembly being supplied with compressed air having a controlled flow rate with a single pressure switch verifying the pressurization of the assembly, while all the resetting air chambers are placed in communication with each other in the same manner, supplied with compressed air having a limited flow rate and provided with another common pressure switch for the entire installation.

According to another feature of the invention, the lubricant is delivered by each metering piston towards a point to be greased by means of a secondary duct consisting of a small-diameter tube arranged, at least as regards some of them, inside an encasing tube, the space between the secondary duct and the corresponding encasing tube being in communication on the distribution side with a leakage air chamber, all the leakage air chambers of the various distributors being themselves in communication with each other and, preferably, with the lubrication air chambers, in such a way that the single pressure switch associated with all the lubrication air chambers and the leakage air chambers enables checking both as to the absence of blockage of all the secondary ducts and the absence of leakage in all of those of these ducts which are provided with an encasing tube.

The encasing tubes may consist of actual tubes or of simple bores formed in the frame of the machine to be greased, the distributors being preferably arranged so as to be suitable for the two types of assembly.

Figure 2:
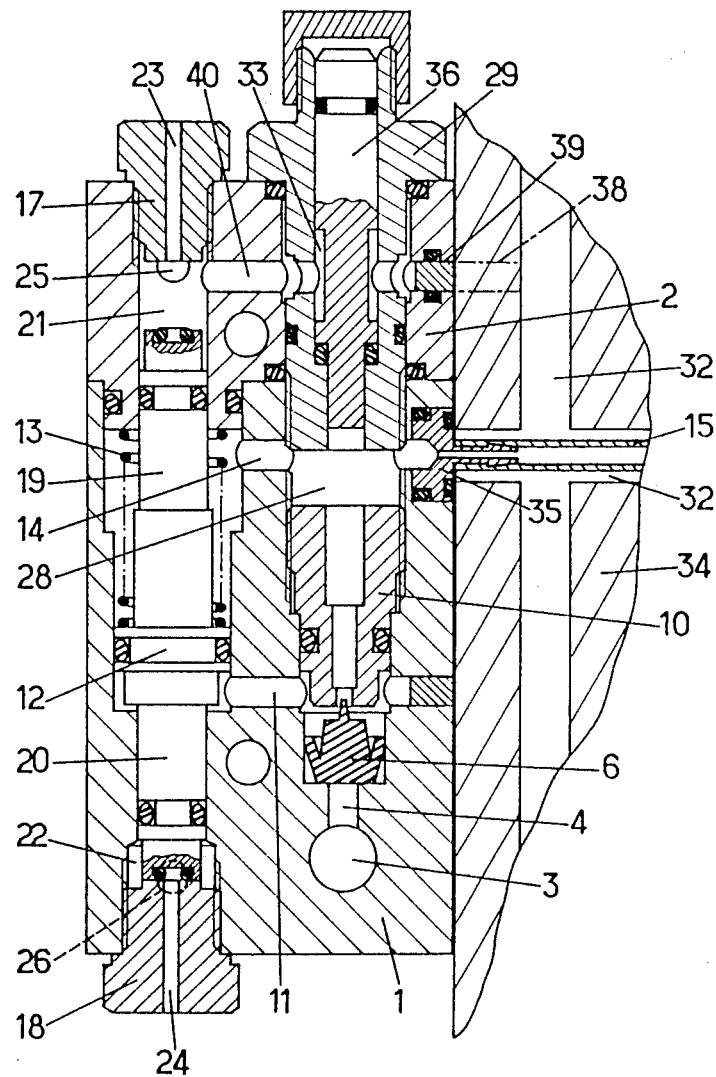

Other features of the invention will emerge from the description which follows of an embodiment provided by way of example and shown in the attached drawings, in which:

FIG. 1 is a partial section through the distributor assembled with an external duct, and FIG. 2 is a corresponding section through the same distributor mounted with bores inside a frame.

The installation comprises, in a known manner, a certain number of distribution blocks, each formed by the stacking of a certain number of parallelepipedal stages, themselves each consisting of a body 1 and a cover 2 forming a housing. The primary duct 3 consists of a bore 3 passing through each stage from one end to the other of each block, the various blocks being joined together by external ducts not shown. This enables each stage 1-2 to be mounted branched off from this primary duct 3 by an inlet orifice 4 which leads into a chamber 5 inside which there slides a double-acting valve 6 of known type, with a peripheral lip 7 and an end seal 8. When the pressure of the lubricant is established inside the primary duct 3, the lubricant pushes the double-acting valve 6 so that its end seal 8 closes the axial passage 9 of a sealed stopper 10 enclosing the top part of the chamber 5, which communicates by a bore 11 with the bottom part of the metering piston 12, thereby raising this piston 12 while compressing a return spring 13 located above the latter. The lubricant situated above the piston 12 is then expelled through a bore 14 towards the secondary duct 15 and the point to be greased 16.

The quantity of lubricant thus delivered by the stage in question is determined exactly by the working surface of the piston 12 and its travel, the latter being itself determined and precisely adjusted by end stoppers 17 and 18 against which there bear respectively the upper rod 19 and lower rod 20 integral with the piston 12 and sliding respectively inside bores forming chambers 21 and 22 closed by the stoppers 17 and 18. It is sufficient therefore to change the length of either one of the stoppers 17 and 18, or of both of them, in order to modify the exact volume of lubricant delivered during each greasing cycle.

Obviously, after the lubricating phase corresponding to pressurization of the primary duct 3 by the lubricant, a known device completely releases the pressure inside this duct, during a resetting phase, during which the pressure situated below the piston 12 and maintained by the compression of the spring 13 pushes the double-acting valve 6 downwards, into the position shown in FIG. 1. The lubricant thus expelled through the bore 11 then escapes through the passage 9 and the bore 14 so as to supply again the upper metering chamber without having any effect on the secondary duct.

So as to check that the metering piston 12 has properly performed the entire designated metering travel, each stopper 17 and 18 is pierced axially by a channel for connection to the atmosphere 23 and 24 which may be hermetically closed at the end of travel by the end of the corresponding rod 19 or 20, provided for this purpose with a suitable seal, thereby closing in sealed manner the corresponding chamber 21 or 22. It is sufficient then to deliver an auxiliary fluid, for example compressed air, through an orifice 25 into the upper chamber 21, or lubrication chamber, and to detect by a suitable means that the pressure is established inside this chamber so as to deduce therefrom that the piston has reached the top of its lubrication travel. The same procedure obviously applies via an inlet 26 into the chamber 22, or resetting chamber, in order to verify that the resetting travel of the piston 12 has been effected to the end of its travel.

For this purpose, according to the invention, the various lubrication chambers 21 are joined together by means of bores 25 passing through each stage and being linked between the blocks by external ducts not shown. By delivering a limited flow of air in all of these ducts, connected to a single pressure switch, it is possible to verify, if contact is established, whether the ends of lubrication travel are effective for all of the metering pistons. In fact, if only one of them did not reach the end of its travel, the pressure could not be established inside the common duct 25, which would be immediately detected by the single pressure switch. The same procedure applies, obviously, in the case of the various resetting chambers 22, which are also joined together by the bores 26, and from block to block by external ducts, with in this case also an air supply having a limited flow rate, separate from the preceding one, but the only one for all the chambers 22, with also a separate, but single pressure switch.

All of the above makes it possible, very simply and at little cost, to verify that, from the distributor to the point to be greased 16, the secondary duct 15 is not blocked. However, as mentioned above, a possibility remains that the point to be greased 16 will not receive the designated amount of lubricant, this is the case when the duct 15, over its length, or at any one of its ends, has a leakage of lubricant.

It is for this reason that the invention envisages moreover the use of a secondary duct 15 in the form of a capillary or small-diameter tube connected by an adapter 27 with the chamber 28 into which the above bores 9 and 14 lead and which is closed by the screwed connection piece 29 serving at the same time to fix the cover 2 on the body 1. In the same manner, at the other end, the secondary duct 15 is connected by an adapter 30 sealably mounted inside the connection piece 31 screwed onto the point to be greased 16. Moreover, according to the invention, this small-diameter tube 15 is arranged inside an encasing tube 32 which itself is sealably connected, for example by a double-cone system or any other connection means, onto the connection piece 29 on the distribution side and onto the connection piece 31 on the greasing point side. This makes it possible to enclose the space comprised between the encasing tube 32 and the secondary duct 15 communicating with a third air chamber 33 forming a leakage control chamber.

As in the case of the air chambers 21 and 22 above, the air chambers 33 may advantageously be joined together and to an air source and a pressure switch in order to verify that there is no leakage either outside the encasing tube 32 or, in particular, inside the secondary duct 15 when delivery of the lubricant has ceased.

However, according to the invention, it is even simpler to join each leakage control chamber 33 of a stage to the chamber 21 for checking the end of lubrication travel so that two checks can be performed at the same time, namely the end of lubrication travel and the absence of leaks.

In fact, if a leak occurs, it is after the end of injection of the lubricant, when the lubricant pressure inside the secondary duct 15 and the point to be greased falls rapidly that this leak may be detected owing to the same air injection and to the same pressure switch as that already used for the first check.

The encasing tube 32 may physically exist, i.e. consist of an external duct as shown in FIG. 1, or else be constituted by means of a simple bore 32 formed in the frame 34 of the machine to be lubricated as in the example of FIG. 2. In this case, the secondary duct 15 is connected by a special adapter 35 on the side of the body 1 so as to lead into the chamber 28 substantially at the level of the bore 14, while on the other hand, the connection adapter 27 is replaced by a solid rod 36 held in place by a stopper as shown in FIG. 2.

In the application of FIG. 1, the seat intended to receive the adapter 35 on the side of the body 1 is simply closed by a closing stopper 37.

In the application of FIG. 2, the various bores 32 forming the encasing tubes may advantageously be joined in a network of bores connected together and connected to the control air source by an external duct for the assembly. They may also be joined, at least in the case of only one of the stages of each block, by means of a bore such as that shown at 38 in FIG. 2 so as to lead into the bore 39 of the cover 2 in the extension of the bore 40 linking the chamber 21 with the chamber 33. A stopper 41 may also be provided in order to close all these bores 39 when they are not used, as in the embodiment of FIG. 1, or those of these bores which are not used in the embodiment of FIG. 2.

The invention thus makes it possible with a moderate lubricating pressure, owing to branched assembly of the various metering stages, and with a large saving of both hydraulic and compressed-air or electrical means, to perform a complete check, not only as to non-obstruction of the secondary ducts, but also as to the absence of leaks, thus ensuring extreme reliability.

Moreover, the device is extremely flexible and allows in particular an existing installation to be modified by adding additional stages, and the leakage check to be carried out on only some of the ducts where it appears to be necessary, and if applicable can be added to those installations for which it has not been intended, without having to make any large-scale modifications to the installation.

What is claimed:

1. In a stage for a centralized greasing installation which has a certain number of such stages assembled in blocks; said stage having a lubrication air chamber, a resetting air chamber, and a metering piston located between said chambers; said air chambers each being provided with an adjusting stopper which has a bore connected to atmosphere, said piston having rods with ends which close said bores at opposite ends of piston travel; supply means for supplying lubricant to said piston, said supply means including a primary duct means, a branched connection, and a double acting valve for supplying intermittently pressurized lubricant to said piston; means for connecting said lubrication air chamber to lubrication air chambers of other such stages and to a common air source having a limited flow rate and to a common pressure switch; means for connecting said resetting chamber to resetting air chambers of other such stages and to another common air source having a limited flow rate and to another common pressure switch, whereby air pressure measurements permit verification that all of the metering pistons of said installation have completed their travel;

the improvement wherein said stage is provided with a secondary duct for conveying lubricant expelled by the metering piston to a point to be greased, said secondary duct including an encasing conduit with a smaller diameter tube therein to define a space, a leakage control air chamber in communication with said space, and means for connecting the leakage control air chamber to leakage control air chambers of other stages in order to check overall the absence of leakage in all secondary ducts of the installation.

2. Apparatus according to claim 1 wherein the leakage control air chamber is connected directly to the lubrication air chamber of the respective stage so that one sensor means can check the pressure in the lubrication air chamber and the leakage control air chamber.

3. Apparatus according to claim 1 wherein the encasing conduit is provided by a bore formed in a frame of a machine which is lubricated by the apparatus.

4. Apparatus according to claim 3 having a housing in which said leakage control air chamber is formed, said housing being joined to said frame.

* * * * *